United States Patent
Winklhofer

(10) Patent No.: US 6,330,788 B1
(45) Date of Patent: Dec. 18, 2001

(54) PLATE CHAINS WITH WEAR-RESISTANT CHAIN JOINTS

(75) Inventor: Gerhard Winklhofer, Krailling (DE)

(73) Assignee: Joh. Winklhofer & Soehne GmbH und Co. KG, Munich (DE)

( * ) Notice: Subject to any disclaimer, the term of this patent is extended or adjusted under 35 U.S.C. 154(b) by 0 days.

(21) Appl. No.: 09/575,744

(22) Filed: May 22, 2000

(30) Foreign Application Priority Data

Jul. 14, 1999 (EP) .................................................. 99113794

(51) Int. Cl.$^7$ ..................................................... F16G 13/06
(52) U.S. Cl. ............................... 59/4; 59/5; 59/8; 474/231
(58) Field of Search ......................... 59/4, 5, 8, 6; 474/231

(56) References Cited

U.S. PATENT DOCUMENTS

| | | |
|---|---|---|
| 1,945,357 | 1/1934 | Pierce . |
| 3,324,737 | 6/1967 | Onulak . |
| 3,426,522 * | 2/1969 | Onulak ................................. 474/231 |
| 5,140,806 * | 8/1992 | Rohloff ..................................... 59/78 |

FOREIGN PATENT DOCUMENTS

| | | |
|---|---|---|
| 4235198A1 | 10/1992 | (DE) . |
| 1011332 | 6/1952 | (FR) . |

\* cited by examiner

*Primary Examiner*—David Jones
(74) *Attorney, Agent, or Firm*—Marshall, Gerstein & Borun

(57) ABSTRACT

A plate chain comprising outer and inner chain links which are interconnected at joint places formed as slide bearings, with each joint place formed by a sleeve of the inner chain link and by a pin bolt of the outer chain link which rotates in the sleeve substantially about its own axis. The wear characteristics of the resulting joint places are improved. At least one portion of the lateral surface of the pin bolt and an associated portion of the inner surface of the sleeve have a different circumferential contour at the pulling side, so that the pin bolt is supported on the sleeve at least two circumferentially spaced-apart points or lines of contact at the pulling side. A method for producing chain members includes forming a sleeve with a joint trough.

11 Claims, 2 Drawing Sheets

PLATE CHAINS WITH WEAR-RESISTANT CHAIN JOINTS

FIELD OF THE INVENTION

The present invention relates to plate chains comprising outer and inner chain links which are interconnected at joint places designed as slide bearings, each of the joint places being formed by a sleeve of the inner chain link and by a pin bolt of the outer chain link which is rotatable in the sleeve substantially about its own axis.

BACKGROUND OF THE INVENTION

In the simplest form of a plate chain, the inner chain link consists of two parallel inner plates that are interconnected by two sleeves arranged in parallel with each other and in a direction perpendicular to the plate chains. The outer chain link consists of outer plates which are arranged in parallel with each other and are connected by means of two pin bolts that are arranged in parallel with each other and in a direction perpendicular to the outer plates. The chain joints are each formed by a sleeve of the inner chain link and by a pint bolt of the outer chain link which extends through the sleeve. Both the inner surface of the sleeve and the outer surface of the pin bolt are shaped in the form of a cylindrical surface so that they function in the manner of a slide bearing in that the pin bolt is pivotable about its own axis inside the sleeve. To achieve a satisfactory function of the joint places, the pin bolt and the sleeve are joined with a suitable play. However, on account of manufacturing inaccuracies and because of said play, there is an increased wear, in particular at the force-transmitting pulling sides of pin bolt and sleeve.

For the reduction of such wear, chains with roller bearings (rocker joints) have inter alia become known, for instance from DE 4235198 A1. In such chains the pin bolt rolls over a convex projection in the sleeve so that there will be no sliding movement as in the case of a slide bearing, but a rolling movement. Such roller bearings do also exist with two pin bolts rolling on one another. Such types of chains with roller bearings are, however, not the subject matter of the present invention. Rather, the intention is to improve a plate chain with simple joint places designed as slide bearings.

SUMMARY OF THE INVENTION

It is therefore the object of the present invention to improve a plate chain of the above-mentioned type with respect to its wear characteristics.

Said object is achieved according to the invention by the features that at least one portion of the lateral surface of the pin bolt and an associated portion of the inner surface of the sleeve have a different circumferential contour at the pulling side so that the pin bolt is supported on the sleeve at at least two circumferentially spaced-apart points or lines of contact at the pulling side. Thus, Hertzian stress is reduced by such a design at the pulling side in the case of a pulling load acting on the surfaces of contact because the number of the points of contact is at least doubled in comparison with conventional plate chains. The force can be transmitted in a correspondingly distributed manner. So far there has always been a line contact in conventional plate chains in the area of the power transmission between pin bolt and sleeve, resulting in correspondingly increased wear. The term pulling side is used here to mean the respectively facing side portions of the inner surface of the sleeve and the outer surface of the associated pin bolt that upon a pulling load acting on the chain will transmit forces. The forces are transmitted in the case of a straight-pulled chain in and opposite to the running direction.

In addition it should be noted that the term "different" circumferential contour" should not be understood as the standard differences or deviations caused during production by manufacturing inaccuracies or the play existing between pin bolt and sleeve. Rather, a deliberately produced different circumferential contour is meant here.

Advantageously, such a difference can be produced in that the pin bolt has a substantially circular cross-section and the sleeve has a substantially circular inner cross-section adapted thereto, with at least one indentation being additionally provided at the pulling side in the lateral surface of the pin bolt and/or the inner surface of the sleeve. It is thereby intended to deviate as little as possible from a circular cross-section of both the inner contour of the sleeve and the outer contour of the pin bolt. As a result, at least one corresponding indentation is just provided at the place required therefor, i.e. in the area of the pulling sides. Each indentation has edges which in case of a load will then serve as support points or lines for the respective counter-element. Such indentations, however, can also be produced by a deformation of the sleeve in the area of the pulling side.

To achieve a support which is as selective as possible over a large area of the sleeve and the pin bolt, respectively, a further variant is provided for in which the inner surface of the sleeve is provided at the pulling side with an axially parallel joint trough whose substantially spaced-apart side edges define two spaced-apart lines of contact for the associated pin bolts. The forces can be transmitted in a very uniform manner thanks to the axially parallel guidance of the joint trough, whereby the contour of the side edges of the joint trough can be designed accordingly.

To achieve said effect also in the end sections which are stiffened by the inner plates of the inner chain links and pertain to the sleeves pressed thereinto, the joint trough may extend over the entire length of the sleeve.

As a variant which can be produced in a particularly simple manner the side edges of the joint trough extend in parallel with each other. This will then be a joint trough of a symmetrical construction which can extend over the entire length of the sleeve.

The joint trough may be incorporated in the axial direction of the sleeve.

To keep notch tensions as small as possible and to avoid any lasting weakening of the sleeve wall, the joint trough may further have a cross section in the form of the segment of a circle (or in the form of a sickle). Preferably, the radius of the segment of a circle is smaller than the radius of the pin bolt so that a positive effect is still observed after the edges of the joint troughs have worn to some extent.

To achieve such a positive effect produced by a joint trough, it is entirely sufficient when the trough has just a small depth. The depth may range from 5 $\mu$m to 25 $\mu$m and is 10 $\mu$m in a preferred embodiment.

To achieve a wall thickness of the sleeve that is not weakened, if possible, relatively large radii are used most of the time for the design of the joint trough; these are nevertheless smaller than the radius of the pin bolt. A variant of particular advantage is where the side edges of the joint trough are arranged relative to the axis of the sleeve at an angle of 90° to 160°, preferably 140°, with respect to each other. An excellent slide bearing effect is thereby achieved by the two points of contact, i.e. also in the area where the plate chain is deflected, e.g. on a chain gear, although in said area the forces are no longer introduced into the chain links exactly in the longitudinal extension of said links.

Preferably, the joint trough is arranged in symmetry with the main pulling direction of the chain at the pulling side. This offers an optimum transmission of the forces in the case of a straight-pulled chain, but also ensures an adequate support and good slide bearing characteristics upon deflection both in the one and the other direction.

The present invention also relates to a method for producing members of a plate chain in which a sleeve is wound by means of a rolling process from a sheet material and a joint trough is incorporated at the pulling side of the sleeve. Advantageously, the joint trough may be incorporated in a step subsequent to the rolling process, whereby a pre-orientation of the sleeve can take place. This is advantageously effected in that the joint trough is incorporated after the joining of an inner chain link. In the joined inner chain link the sleeves already have a corresponding orientation so that the pulling sides can very easily be detected. An orientation of sleeves already provided with a joint trough for joining an inner chain link can thus be dispensed with, which otherwise would entail considerable problems in connection with the joining technique.

According to a variant of the invention the joint trough is incorporated by means of a drawing punch which is movable into the sleeve. For instance, the blanks of the inner chain links can be moved into a corresponding station and the joint troughs can then be produced by drawing punches moving thereinto. This constitutes a very simple working step and does not require any devices or process steps that would be very expensive and troublesome.

BRIEF DESCRIPTION OF THE DRAWINGS

An embodiment of the present invention shall now be explained in more detail with reference to drawings, in which.

DETAILED DESCRIPTION OF THE PREFERRED EMBODIMENT

Figure 1:
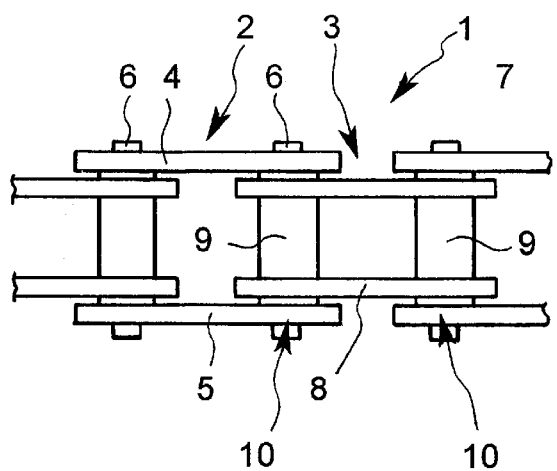
FIG. 1 is a top view showing a section of a plate chain.

The plate chain 1 shown in FIG. 1 comprises outer chain links 2 and inner chain links 3 that are alternately arranged one after the other.

In the illustrated chain an outer chain link 2 consists of two outer plates 4 and 5 of steel sheet that are arranged in parallel with each other and are each pressed onto the end portions of two pin bolts 6 that are arranged in parallel with each other and extend in a direction perpendicular to the outer plates 4 and 5.

Each of the inner chain links consists of two inner plates 7 and 8 of sheet steel that are arranged in parallel with each other and of two sleeves 9 that are arranged in parallel with each other and in a direction perpendicular to the inner plates 7 and 8. The sleeves 9 are pressed into the inner plates 7, 8. The plates of the outer and inner chain links 2, 3 are respectively arranged in parallel with one another, the inner chain links 3 being positioned inside the outer plates 4 of the outer chain links 2. One respective pin bolt 6 of the outer chain link extends through the opening of the sleeve 9 of the inner chain link 3, whereby chain joints 10 are formed. The pin bolts 6 have a cylindrical shape of a correspondingly circular cross-section and the sleeves 9 are shaped in the form of a cylindrical tube of a substantially circular cross-section. However, the inner surface 11 of the sleeves 9 differs from a cylindrical surface.

Figure 2:
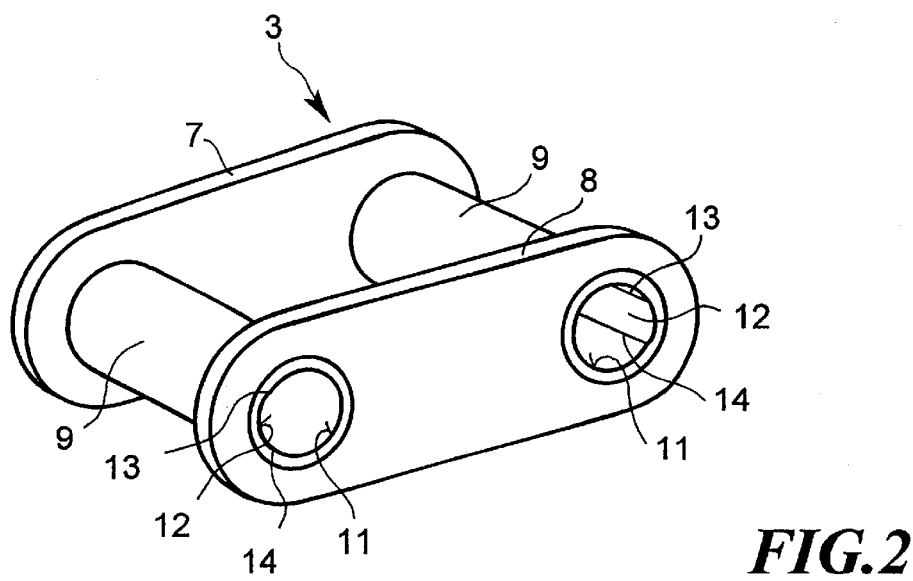
FIG. 2 is an enlarged perspective side view showing an inner chain link of the chain of FIG. 1.
Figure 3:
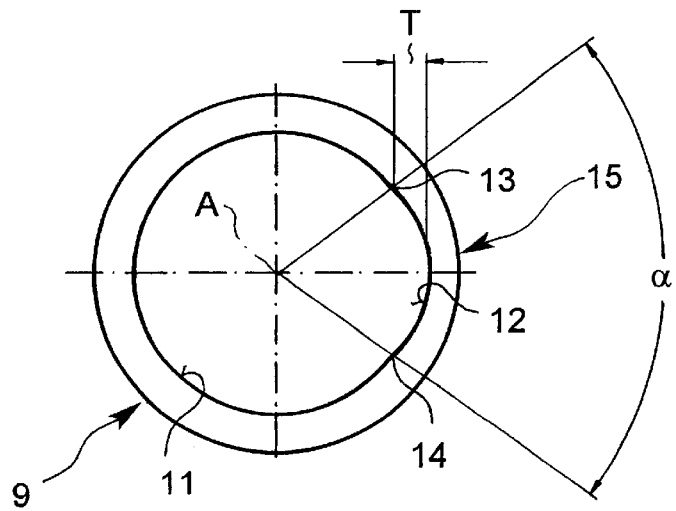
FIG. 3 is a front view of a sleeve of the inner chain link of FIG. 2 on enlarged scale.
Figure 4:
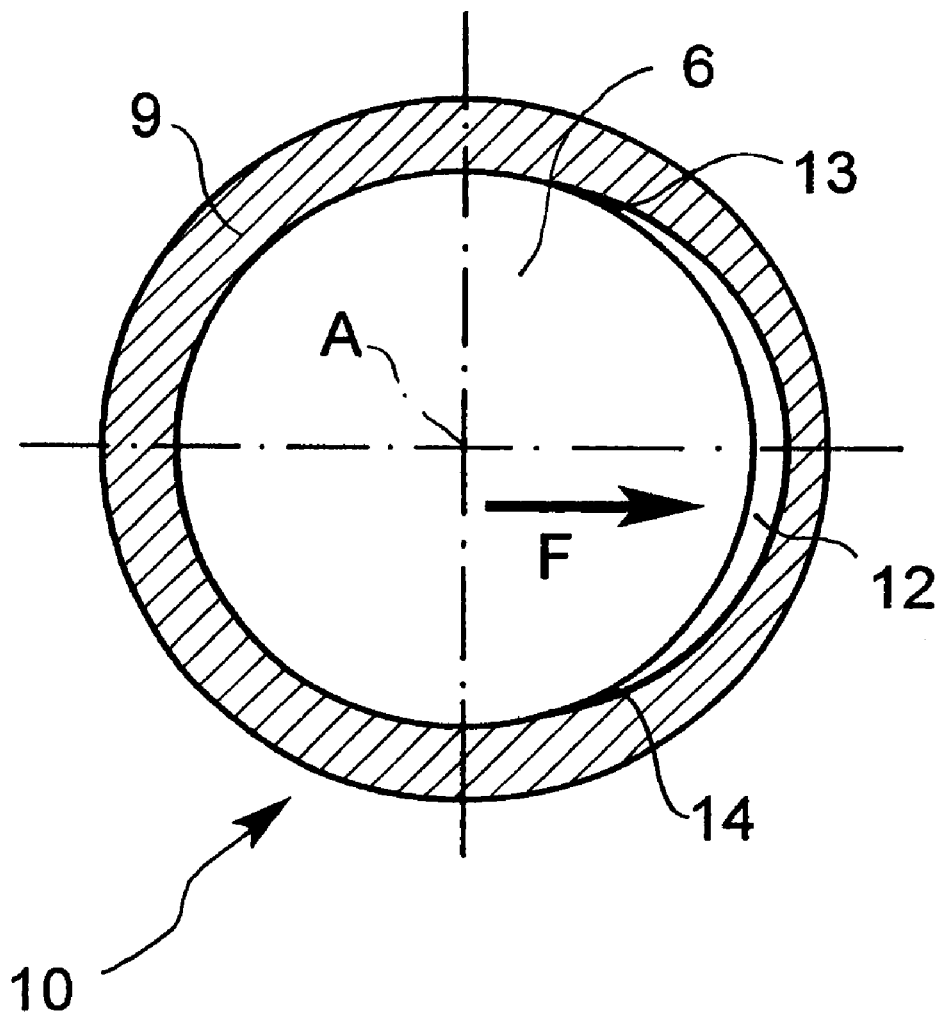
FIG. 4 is a full section through a chain joint on an enlarged scale.

Said difference can clearly be seen in FIGS. 2 and 3. The illustrated embodiment regards a joint trough 12 of a substantially uniform width which extends in parallel with the sleeve axis. The joint trough 12 is defined by two trough edges 13 and 14 that extend in parallel with each other and in parallel with the sleeve axis. The joint trough 12 of the sleeve 9 of an inner chain link 3 is oriented away from a plane which extends in a direction perpendicular to the longitudinal direction of the chain and is centrally arranged relative to the inner chain link 3. This, however, means that the joint troughs 12 of the two sleeves 9 of an inner chain link 3 are oriented away from each other or are respectively arranged in the direction of the end portions of the inner chain links 3. As a result, the joint trough 12 is arranged at the pulling side 15 of the sleeve 9. The pulling side 15 is that side that upon a pulling load on the chain must receive the force exerted by the associated pin bolt 6. In FIG. 4 the direction of force F is shown by way of a symbol.

The depth T of the joint trough 12 which is shown in FIG. 3 and measured from the trough edge 13 and 14, respectively, to the base of the joint trough 12 is normally about 10 µm. The cross-sectional shape of the joint trough 12 is substantially in the form of the segment of a circle to avoid a weakening of the wall thickness of the joint sleeve as much as possible. The angle α which is enclosed by the trough edges 13 and 14 relative to the central axis A of the sleeve is about 90° in the instant case. Other angles, in particular in the range of from 130° to 150°, may be preferred for specific applications.

FIG. 4 shows the pin bolt 6 arranged in the sleeve 9, thereby illustrating a cross section through the chain joint 10. The openings of the sleeve 9 and of the pin bolts 6 are arranged to be substantially coaxial to the axis A of the joint, and the pin bolt 6 can rotate in the manner of a slide bearing inside the sleeve opening and pivot across a predetermined pivotal path. Since the pin bolt 6 has a surface in the form of a cylindrical surface, it will come to rest substantially in the area of the trough edges 13 and 14 upon the application of a pulling load, so that the force will be transmitted at said places from the pin bolt 6 onto the joint sleeve 9. The area between the trough edges 13, 14 is here not in contact with the surface of the pin bolt. In the case of a load two very exactly predetermined lines of contact are thereby substantially defined so that the force is evenly distributed and excessively high compression forces within the joint 10 do not arise.

In further embodiments it would also be possible to leave the inner surface 11 of the sleeve 9 in the form of a cylindrical surface and to provide the pin bolt 6 with a corresponding contour. As for pin bolt 6, it would be enough to provide a kind of key surface at the pulling side. However, indentations of any desired shape with rounded edges are also possible.

I claim:

1. A plate chain comprising in combination outer and inner chain links (2, 3) which are interconnected at joint places (10) formed as slide bearings, each of said joint places (10) being formed by a sleeve (9) of said inner chain link (3) and by a pin bolt (6) of said outer chain link (2) which in said sleeve (9) substantially rotates about its own axis (A), at least one portion of a lateral surface of said pin bolt (6) engaging a facing portion of the inner surface (11) of said sleeve (9) when a pulling force is exerted on the plate chain to define a pulling side (15) of said joint place (10), said at least one portion of said lateral surface of said pin bolt (6) and said facing portion of the inner surface (11) of said sleeve (9) having different circumferential contours so that said pin bolt (6) is supported on said sleeve (9) at at least two circumferentially spaced-apart points or lines of contact at said pulling side (15).

2. The plate chain according to claim 1, wherein said pin bolt (6) has a substantially circular cross-section and said sleeve (9) has a substantially circular inner cross-section adapted thereto, at least one indentation being additionally provided at said pulling side (15) in said lateral surface of said pin bolt (6) and/or said inner surface (11) of said sleeve (9).

3. The plate chain according to claim 1, wherein said inner surface (11) of said sleeve is provided at said pulling side (15) with an axially parallel joint trough (12) whose substantially spaced-apart side edges (13, 14) define the two spaced-apart lines of contact for the associated said pin bolt (6).

4. The plate chain according to claim 3, wherein said joint trough (12) extends over the entire length of said sleeve (9).

5. The plate chain according to claim 3, wherein said side edges (13, 14) of said joint trough (12) extend in parallel with each other.

6. The plate chain according to claim 3, 4, or 5, wherein said joint trough (12) has a cross section shaped as a circle segment.

7. The plate chain according to claim 3, wherein said joint trough (12) has a depth (T) in the range of from approximately 5 $\mu$m to 25 $\mu$m.

8. The plate chain according to claim 3, wherein said side edges (13, 14) of said joint trough (12) are arranged relative to the axis (A) of said sleeve (9) at an angle ($\alpha$) in the range of from approximately 90° to 160° with respect to each other.

9. The plate chain according to claim 3, 4, or 5, wherein said joint trough (12) is arranged in symmetry with a main pulling direction of the chain at said pulling side (15).

10. The plate chain according to claim 7, wherein said depth (T) of said joint trough (12) is approximately 10 $\mu$m.

11. The plate chain according to claim 8, wherein said angle $\alpha$ is approximately 140°.

\* \* \* \* \*